(12) United States Patent
Selby

(10) Patent No.: US 7,712,195 B1
(45) Date of Patent: May 11, 2010

(54) FLAT, FOLDED BUNGEE CORD ANCHORED IN MOLDED BASE

(75) Inventor: Ricky W. Selby, Moosup, CT (US)

(73) Assignee: Keeper Corporation, North Windham, CT (US)

( * ) Notice: Subject to any disclaimer, the term of this patent is extended or adjusted under 35 U.S.C. 154(b) by 418 days.

(21) Appl. No.: 11/731,513

(22) Filed: Mar. 30, 2007

(51) Int. Cl.
*F16B 45/00* (2006.01)

(52) U.S. Cl. ............... 24/265 R; 24/265 H; 24/300; 24/301

(58) Field of Classification Search ............ None
See application file for complete search history.

(56) References Cited

U.S. PATENT DOCUMENTS

| | | | | |
|---|---|---|---|---|
| 1,662,609 A | * | 3/1928 | Hirsch | 139/421 |
| 1,963,813 A | * | 6/1934 | Van Voorhis | 57/225 |
| 2,152,826 A | * | 4/1939 | Spencer | 428/365 |
| 3,129,631 A | * | 4/1964 | Hill et al. | 87/6 |
| 3,474,507 A | * | 10/1969 | Thompson | 24/265 AL |
| 3,477,104 A | * | 11/1969 | Lewis | 24/611 |
| 4,573,842 A | * | 3/1986 | Mantela et al. | 410/23 |
| 5,225,262 A | * | 7/1993 | Leduc | 428/75 |
| 5,615,811 A | * | 4/1997 | Bell et al. | 224/150 |
| 5,638,584 A | * | 6/1997 | De Anfrasio | 24/265 H |
| 6,390,523 B2 | * | 5/2002 | Fujikawa et al. | 294/82.11 |
| 7,171,731 B1 | * | 2/2007 | Borcherding | 24/302 |
| 7,228,600 B1 | * | 6/2007 | Selby et al. | 24/300 |
| 7,540,070 B1 | * | 6/2009 | Selby | 24/265 H |
| 2009/0100646 A1 | * | 4/2009 | Wang | 24/265 H |

* cited by examiner

*Primary Examiner*—Jack W. Lavinder
(74) *Attorney, Agent, or Firm*—M. P. Williams

(57) ABSTRACT

A transverse pin (17) passes through an end loop (46) in a folded, multi-core (43) or single core (69), flat bungee cord (43, 69) to anchor the bungee cord within a molded base (49). The pin extends past the end loop of the bungee cord so as to restrain longitudinal movement thereof. The pin and end loop are molded into the base. The pin may comprise a transverse portion of a wire (19) forming a hook (25).

2 Claims, 2 Drawing Sheets

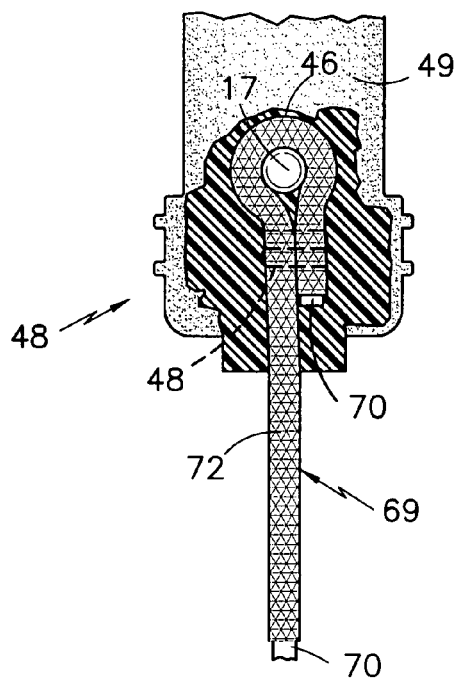
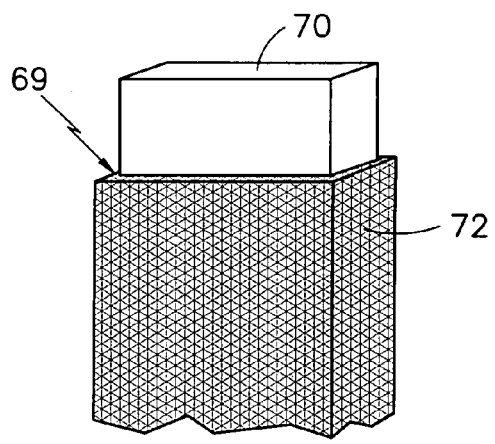
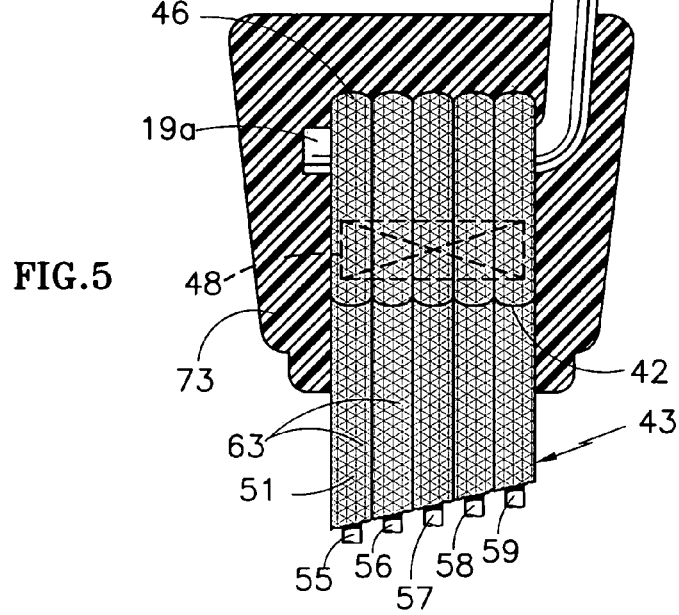

FLAT, FOLDED BUNGEE CORD ANCHORED IN MOLDED BASE

TECHNICAL FIELD

This invention relates to a flat bungee cord (stretch cord) with its end folded over to provide a loop, which is anchored by a transverse pin or hook wire passing through the loop in the bungee cord, to provide longitudinal-movement restraint, the loop and the wire or pin being molded into a base of a bungee cord terminus.

BACKGROUND ART

Bungee cords are extremely common and used in a variety of ways. The most simple and common bungee cord terminus is a stiff wire hook which connects with a coiled wire basket. The bungee cord is fed into the basket, bent back on itself, and the loop so formed is secured by a crimped hog ring. The position of one form of terminus known in the art is adjustable along the length of the cord; in other forms the position is fixed. A variety of still other forms are known to provide a variety of features to suit different applications. Many have open hooks; others rely on thin plastic or metal closures; some are plastic, and some are metal.

In the prior art, there are several ways utilized to anchor a bungee cord in a hook or other terminus, one of which is to tie the end of the bungee cord in a knot and have it engage a previously formed terminus, or have it molded into a terminus. However, this results in a very bulky terminus which gets in the way of anchoring the bungee cord in a variety of situations.

Another known method is to simply loop the end of the bungee cord through an eye formed in a proximal end of a hook, cinch it with a hog ring, and cast it into a molded terminus base. To make the terminus smaller, it has been known to use crimps, or hog rings cast within a molded terminus. However, bungee cords become thinner as they are stretched by additional loading, and can become sufficiently thin so as to slip out of a crimp or hog ring.

Flat bungee cords, being thinner than round bungee cords of the same strength, have been found to be difficult to anchor within a terminus. Typical flat bungee cord is composed of 10 or 12 individual small bungee cords, with the braiding of the outer sleeve interwoven so as to connect them into a single unified bungee cord. Utilizing knots, crimps or hog rings distort the shape of flat bungee cord, and do not grip flat bungee cords as well as they do round bungee cords. Distortion also makes the flat cords more bulky than similarly treated round bungee cords. In both multi-core, composite stranded bungee cords, described above, and in single, solid core flat bungee cords, the core is quite thin making it difficult to adequately support the load of the entire cord at a single point.

DISCLOSURE OF INVENTION

Objects of the invention include: a flat bungee cord with a terminus which is low-cost and sturdy; a flat bungee cord with a terminus which is easily assembled which, however, is reliable; longitudinal restraint of a flat bungee cord which is compact, which supports easy assembly, and which sustains adequate loads; and an improved, terminated flat bungee cord.

According to the present invention, a flat bungee cord is anchored into a molded base by means of a transverse pin or hook wire which passes through a loop formed in the end of the bungee cord, thereby acting as a longitudinal-movement restraint. The pin or hook wire extends through an end loop in a folded-over single core flat bungee cord or composite flat bungee cord formed of a plurality of adjacent, small bungee cords held together by interlaced braiding.

Utilizing a transverse pin or hook wire to anchor the bungee cord in a molded base allows loading the bungee cord without risk of it pulling out of the terminus. Use of flat bungee cord makes it possible to have high strength with a flat, compact terminus.

The folded, flat bungee cord may be anchored by means of a separate pin passing through the end loop of the bungee cord and extending beyond the width of the bungee cord. Alternatively, the invention may be practiced in a bungee cord terminus having a hook portion formed of coated or uncoated wire, the cross section of the wire being round, square, rectangular or of any other shape, the distal end of the wire being anchored in a molded base, the distal end of the wire passing through the end loop of the bungee cord so as to restrain it from longitudinal movement.

Other objects, features and advantages of the present invention will become more apparent in the light of the following detailed description of exemplary embodiments thereof, as illustrated in the accompanying drawings.

BRIEF DESCRIPTION OF THE DRAWINGS

FIG. 3 is a fractional, sectioned front elevation view of a flat bungee cord having a single, solid core anchored to a terminus with a pin.

FIG. 4 is a fragmentary perspective view of a flat bungee cord having a single, solid core.

FIG. 5 is a fractional sectioned side elevation view of a composite flat bungee cord anchored on a hook wire.

MODE(S) FOR IMPLEMENTATION

Figure 1:
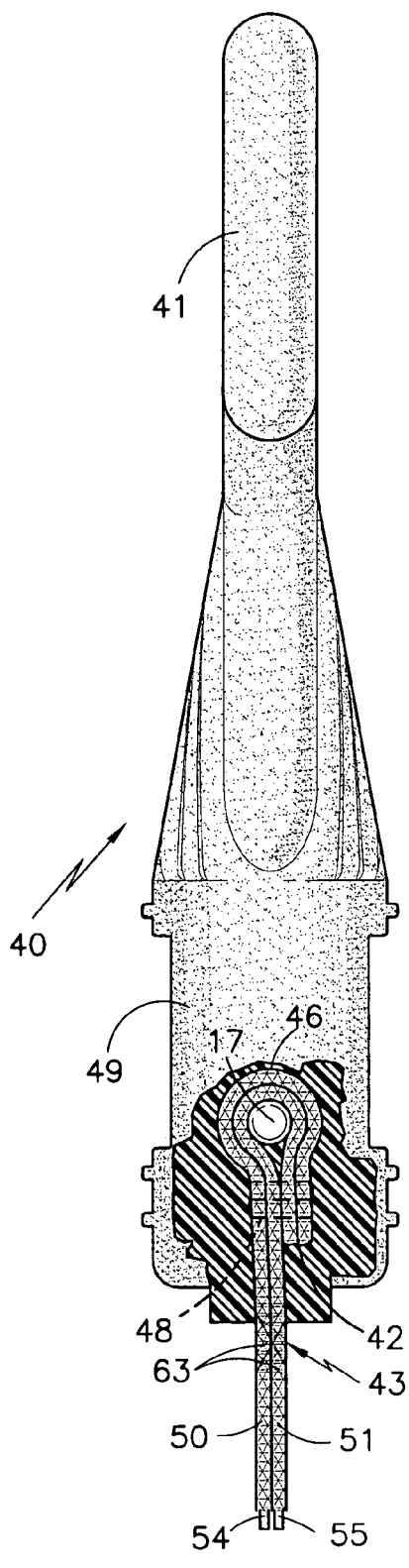
FIG. 1 is a partially sectioned front elevation view of a terminus secured to a composite flat bungee cord with a transverse pin according to the invention.
Figure 2:
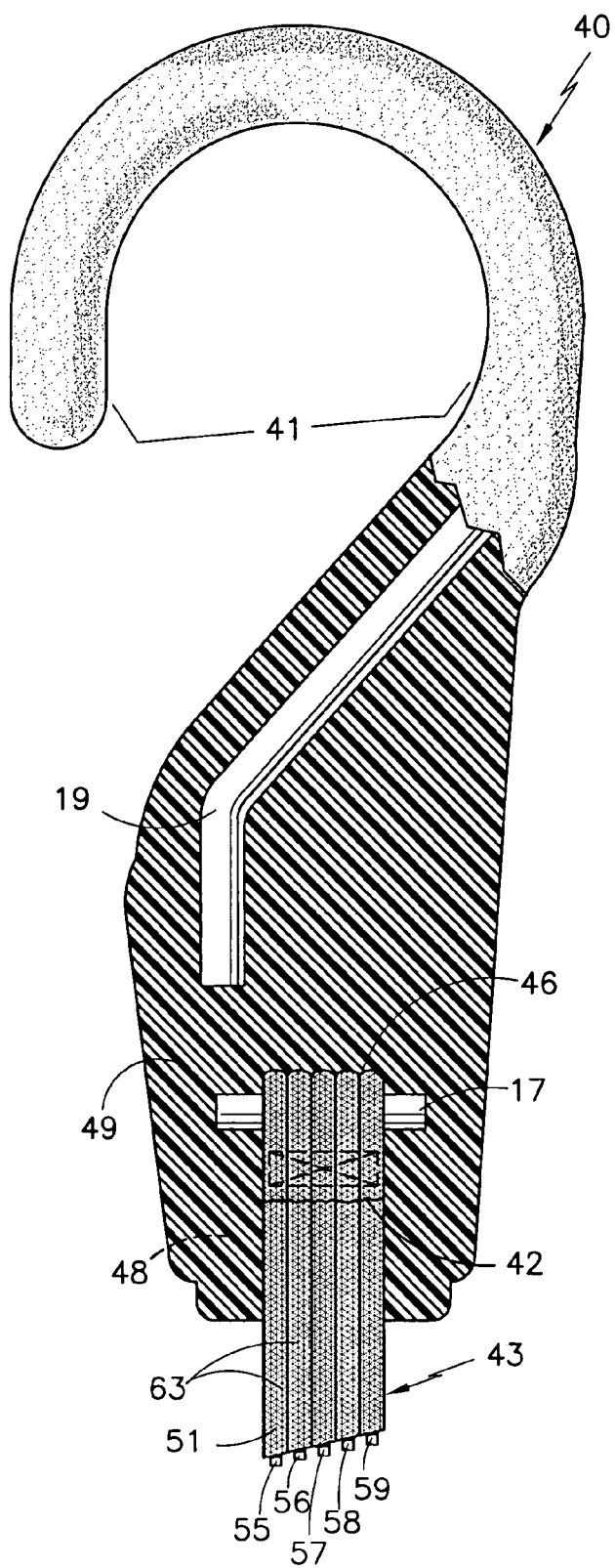
FIG. 2 is a partially sectioned side elevation view of the composite flat bungee cord and terminus of FIG. 1.

Referring to FIGS. 1 and 2, a terminus 40 having a hook 41 formed by a hook wire 19 is secured to the end 42 of a composite flat bungee cord 43 folded over on itself so as to form a loop 46 through which a transverse pin 17 passes. As used herein, the term "wire" is defined to include metals and other materials of various thickness. The loop 46 may be secured in any suitable fashion, such as by means of cross stitching 48. The pin extends beyond the bungee cord, as seen in FIG. 2, so as to restrain the loop from pulling out of the base 49 after the loop 46 and pin are molded into the base.

In the embodiment of FIGS. 1 and 2, the composite flat bungee cord 43 is formed by braiding together a plurality of mutually parallel, adjacent small bungee cords 50, 51, each having its own elastic core 54-59. The braiding 63 of threads on each of the cores 54-59 is interlaced with the braiding 63 on each core adjacent thereto, so as to bind them altogether in flat lay as shown, to form a single, flat bungee cord 43.

However, as illustrated in FIGS. 3 and 4, a solid flat bungee cord 69 may instead comprise a single, flat, elastic core 70 with suitable braid 72. The folded bungee cord 43, 69 with the pin 17 passing through the loop 46 is molded into the base 73 of the terminus 40.

In FIG. 5, the invention is implemented by passing a transverse portion 19a of the hook wire 19 through the loop 46 and molding the hook wire 19 and bungee cord 43 into the base 73. The transverse portion 19*a* constitutes the transverse pin instead of a separate pin 17. The transverse portion 19*a* extends outside the loop to restrain longitudinal movement of the bungee cord with respect to the base 73.

The transverse pin anchor of the invention may be used with any other sort of non-adjustable bungee cord terminus.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A terminated bungee cord, comprising:
    a molded base;
    a flat bungee cord having a plurality of mutually adjacent and parallel elastic cores wrapped with braided threads that are mutually interlaced to bind said cores together in a flat lay; and
    an end folded into a flattened loop with a transverse pin passing through the loop perpendicular to the longitudinal axis of the bungee cord, said end of the bungee cord and said pin molded into said base with said pin disposed in the loop with the pin extending beyond the bungee cord to restrain longitudinal-movement of the bungee cord with respect to said base.

2. A terminated bungee cord comprising:
    a molded base;
    a flat bungee cord having a plurality of mutually adjacent and parallel elastic cores wrapped with braided threads that are mutually interlaced to bind said cores together in a flat lay;
    an end folded into a flattened loop with a transverse pin passing through the loop perpendicular to the longitudinal axis of the bungee cord, said end of the bungee cord and said pin molded into said base with said pin disposed in the loop with the pin extending beyond the bungee cord to restrain longitudinal-movement of the bungee cord with respect to said base; and
    a wire bent, beginning at a distal end of said wire, in substantially a semi-circle to form a hook portion, said hook portion being contiguous with a substantially straight shank portion of said wire, a proximal end of said wire being molded into said base separated from said loop and said pin.

* * * * *